United States Patent
Tsuneyoshi et al.

(10) Patent No.: US 6,570,277 B2
(45) Date of Patent: May 27, 2003

(54) ROTATING ELECTRIC MACHINE

(75) Inventors: Takashi Tsuneyoshi, Yokohama (JP); Shinichiro Kitada, Tokyo (JP); Toshio Kikuchi, Yokosuka (JP); Yutaro Kaneko, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/147,960

(22) Filed: May 20, 2002

(65) Prior Publication Data

US 2002/0195885 A1 Dec. 26, 2002

(30) Foreign Application Priority Data

Jun. 20, 2001 (JP) ........................................ 2001-186218

(51) Int. Cl.[7] ................................................. H02K 9/19
(52) U.S. Cl. ........................................... 310/54; 310/89
(58) Field of Search ........................... 310/43, 254, 52, 310/54, 58, 42, 86, 87

(56) References Cited

U.S. PATENT DOCUMENTS

| | | | | |
|---|---|---|---|---|
| 3,609,420 A | * | 9/1971 | Inagaki et al. | 310/54 |
| 4,994,700 A | * | 2/1991 | Bansal et al. | 310/215 |
| 5,583,387 A | * | 12/1996 | Takeuchi et al. | 174/DIG. 20 |
| 5,585,682 A | * | 12/1996 | Konicek et al. | 310/258 |

FOREIGN PATENT DOCUMENTS

JP 05-328656 12/1993

* cited by examiner

Primary Examiner—Nestor Ramirez
Assistant Examiner—Nguyen Hanh
(74) Attorney, Agent, or Firm—Foley & Lardner

(57) ABSTRACT

An annular member 51 is fitted to the outer periphery of the stator cores in a rotating electric machine. The rotating electric machine has a cooling passage 29 in an axial direction between a resin molded section 50 and adjacent stator cores 20. The annular member 51 is formed from a material which has a larger coefficient of linear expansion than the magnetic material comprising the stator cores. At low temperatures, stress resulting from the differential between the coefficient of linear expansion of the stator core and the resin molded section is reduced because an inward compressive force is applied to the stator core by the annular member as a result of the difference in the coefficient of linear expansion.

11 Claims, 3 Drawing Sheets

ROTATING ELECTRIC MACHINE

FIELD OF THE INVENTION

This invention relates to a rotating electric machine having a cooling passage, the rotating electric machine functioning as a motor or a generator.

BACKGROUND OF THE INVENTION

One type of rotating electric machine is provided with a plurality of stator cores connected with each other in a circular orientation. A cooling passage is provided which is defined by two adjacent stator cores and a circular resin mold which closes the slot openings. In this type of rotating electric machine, there is the possibility of leakage of cooling medium as a result of cooling shrinkage in the resin mold.

Tokkai Hei 5-328656 published by the Japanese Patent Office in 1993 discloses a rotating electric machine provided with a housing member for a bearing of the rotor. The bearing housing member contacts the resin mold and suppresses cooling shrinkage in the resin mold. In this rotating electric machine, a coefficient of linear (thermal) expansion for the bearing housing member is the same as that for the magnetic steel plates comprising the stator core. Consequently, the degree of stress between the stator core and the resin mold is reduced and it is possible to prevent damage to the resin mold as a result of cooling shrinkage.

SUMMARY OF THE INVENTION

However since large-scale rotating electric machines are assembled by fitting the bearing housing member after forming the resin molding on the stator core, it is necessary to carefully control the dimensions of the bearing housing member. From the point of view of cost and productivity, this type of structure is not used in the prior art with respect to large-scale rotating electric machines.

It is therefore an object of this invention to avoid the generation of stress between the stator core and the resin mold during cooling shrinkage of resin molding in all rotating electric machines including large-scale rotating electric machines.

In order to achieve above object, this invention provides a rotating electric machine comprising: a rotor; a circular stator having a plurality of stator cores connected about the periphery of the rotor and an annular member disposed on the outer periphery of the plurality of stator cores; a case for housing the rotor and the stator; a cylindrical resin molded section formed along the inner peripheral face of the stator and covering slot openings between stator cores; and a cooling passage extending along an axial direction of the rotor and being defined by adjacent stator cores and the resin molded section.

The annular member is formed from a material which has a larger coefficient of linear expansion than the magnetic material comprising the stator cores.

The details as well as other features and advantages of this invention are set forth in the remainder of the specification and are shown in the accompanying drawings.

DESCRIPTION OF THE PREFERRED EMBODIMENTS

Figure 1:
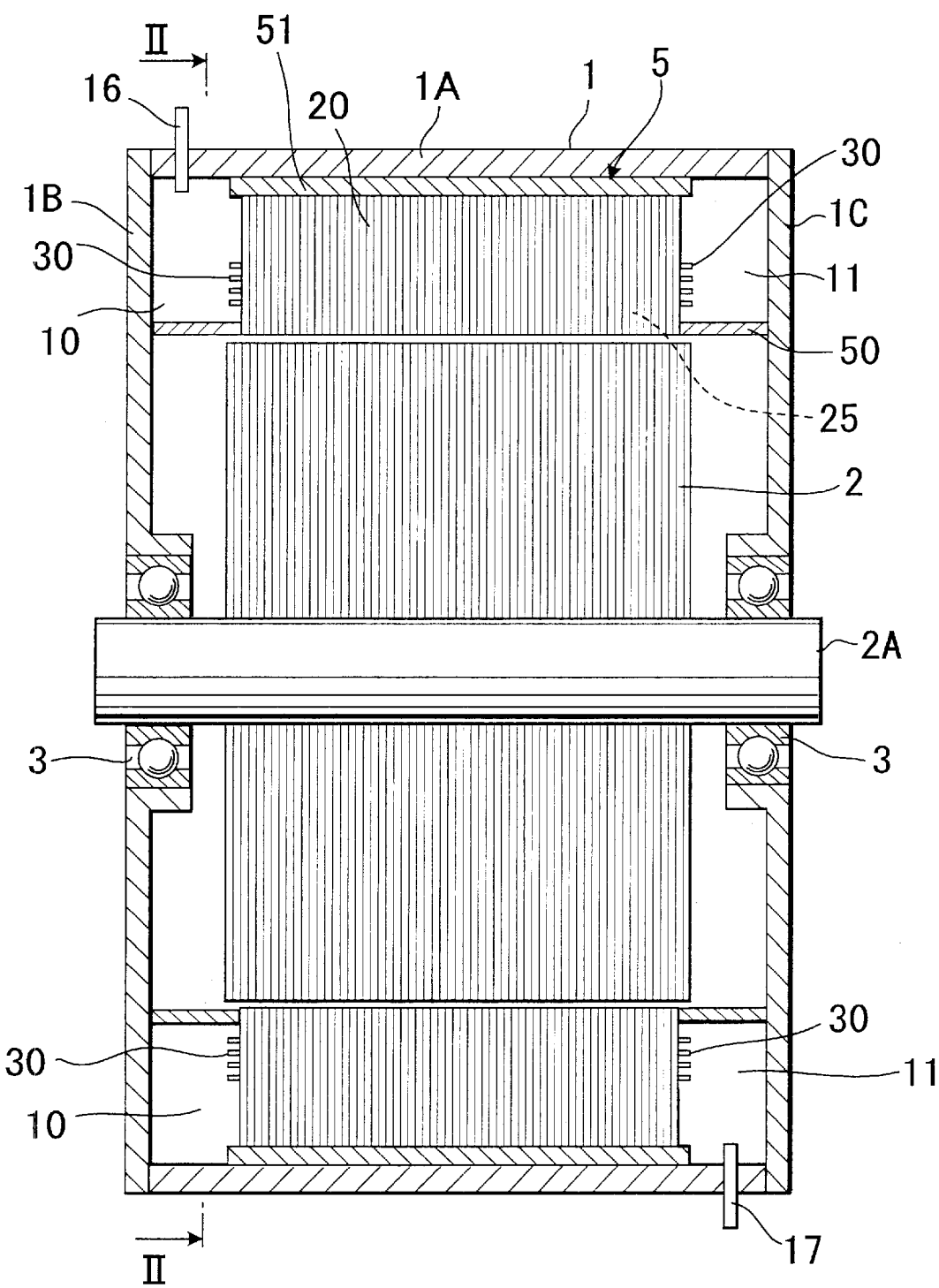
FIG. 1 is a sectional view along an axial direction of a rotating electric machine according to a first embodiment.
Figure 2A:
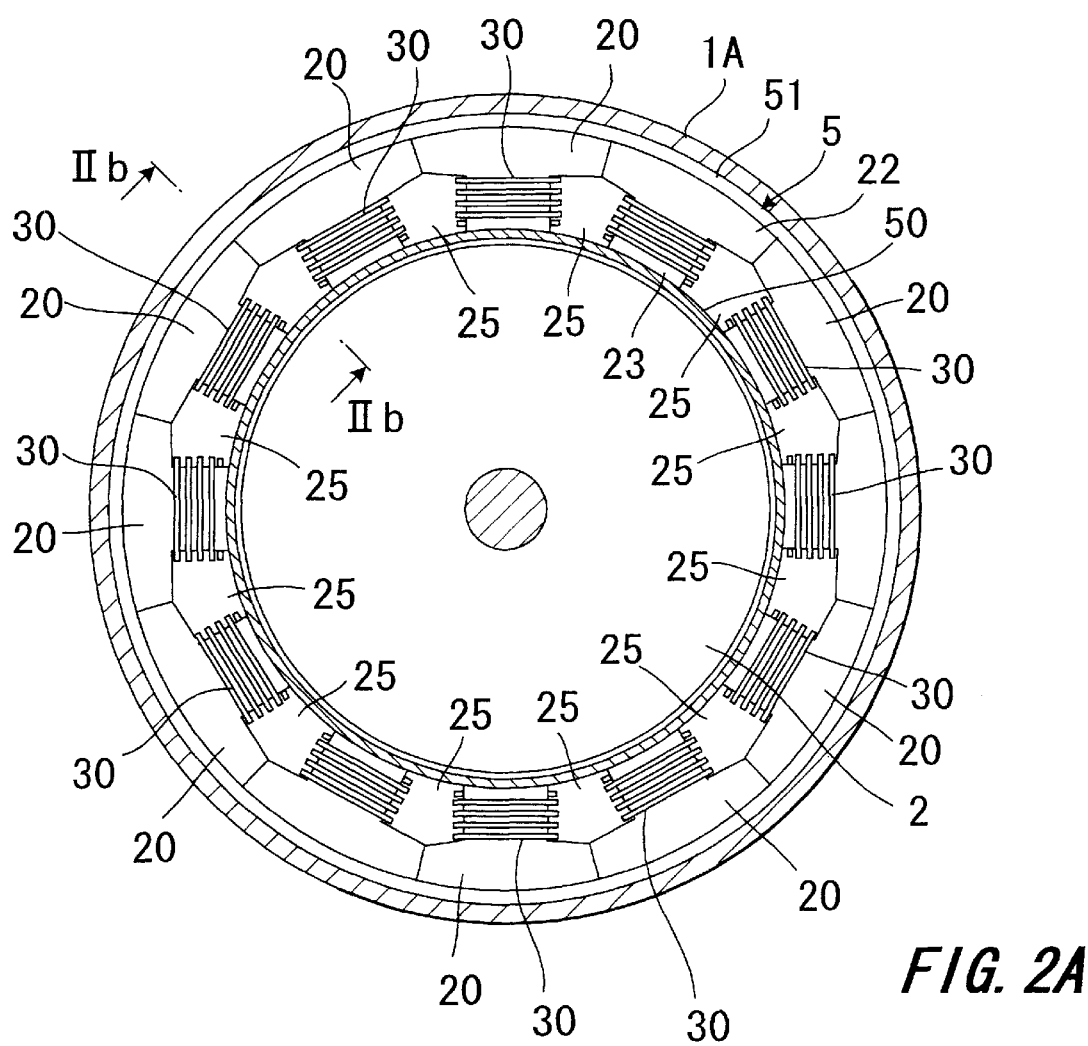
FIG. 2A is a sectional view of a rotating electric machine taken along the line II—II in FIG. 1.
Figure 2B:
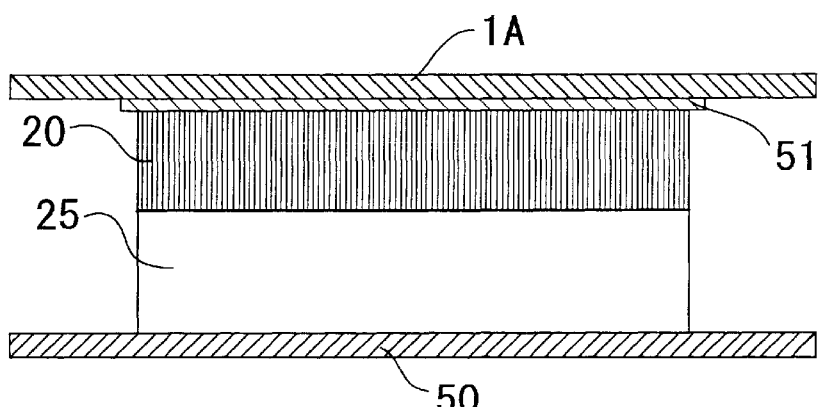
FIG. 2B is a sectional view of a stator taken along the line IIb—IIb in FIG. 2A.

Referring to FIG. 1, FIG. 2A and FIG. 2B, a case 1 of a rotating electric machine comprises a cylindrical section 1A and two cover plates 1B, 1C which respectively cover the opening on both ends of the cylindrical section 1A.

A rotor 2 is housed in the case 1. Both ends of the rotation shaft 2A of the rotor 2 are supported on the cover plates 1B, 1C through their respective bearings 3. A cylindrical stator 5 is fitted to the cylindrical section 1A and is disposed around the outer periphery of the rotor 2.

A cooling jacket 10, 11 comprises an annular space defined by a resin molded section 50, both axial ends of the stator 5, and the inner peripheral face of the case 1. Cooling oil is supplied through an oil supply mouth 16 to the cooling jacket 10. The oil supply mouth 16 passes through the cylindrical section 1A. The cooling oil passes through a cooling passage formed in the stator 5, that is to say, it passes through the slots 25 and is introduced into the cooling jacket 11 on the opposite side. Thereafter the cooling oil is discharged to the outside from an oil discharge mouth 17 which is formed through the cylindrical section 1A on the lateral face of the cooling jacket 11.

Referring to FIG. 2A, the stator 5 is formed in an annular shape. The stator 5 is provided with a fixed number of stator cores 20 which are connected in a circular orientation about the rotor 2, and coils 30 which are wound onto the periphery of the teeth 23 of the stator cores 20. In this embodiment, the fixed number of stator cores 20 is twelve.

Each stator core 20 is formed by laminating a plurality of magnetic steel plates with respect to the axial direction of the rotor 2. The stator cores 20 are provided with back cores 22 and the teeth 23. The back cores 22 are connected in a circular shape along the inner peripheral face of the cylindrical section 1A of the case 1. The teeth 23 project radially from the back cores 22 towards the rotor 2. The cross-sectional shape of each stator core 20 is substantially in the form of a letter "T". An indentation between adjacent teeth 23 comprises the slot 25. The coils 30 are housed in the slots 25 by concentrated windings on each of the teeth 23.

Referring to FIGS. 2A and 2B, the resin molded section 50 covers the slot opening facing the outer periphery of the rotor 2 and adheres to the stator cores 20, so that the slot 25 functions as a cooling passage for cooling oil flowing from the cooling jacket 10. Thus, the resin molded section 50 takes a cylindrical shape along the inner peripheral face of the stator 5. The resin molded section 50 is formed by a resin molding process so that the tips of the teeth 23 of the stator cores 20 are exposed, facing the rotor 2. As a result, the resin molded section 50 is provided with the fixed number of openings into which the tips of the teeth 23 are inserted. Both ends of the resin molded section 50 reach the cover plates 1B, 1C, as shown in FIG. 1. Hence, the annular cooling jackets 10, 11 described above are formed between the front and rear ends of the stator cores 20 and the case 1.

Furthermore, the stator 5 is provided with an annular member 51 which is fitted to the outer periphery of the stator cores 20 by using shrink fitting. The annular member 51 has a cylindrical shape which is slightly longer with respect to the axial direction than the stator core 20. The annular member 51 is made from stainless steel. The annular member 51 has a larger coefficient of linear (thermal) expansion $\alpha 1$ than the coefficient of linear expansion $\alpha 2$ of the magnetic steel plates which form the stator cores 20. Furthermore the coefficient of linear expansion $\alpha 1$ of the annular member 51 is greater than the coefficient of linear expansion $\alpha 3$ of the resin molded section 50. The linear expansion $\alpha 1$ is $17\sim 18\times 10^{-6}/°$ C., the linear expansion $\alpha 2$ is $12\sim 15\times 10^{-6}/°$ C., and the linear expansion $\alpha 3$ is $16\times 10^{-6}/°$ C.

The coefficient of linear expansion $\alpha 3$ of the resin molded section 50 is generally greater than the coefficient of linear expansion $\alpha 2$ of the magnetic steel plates which form the stator cores 20 ($\alpha 3 > \alpha 2$). Consequently, at low temperatures lower than the temperature at which the resin molding was performed, a deleterious shearing stress is generated on contact surface between the resin molded section 50 and the stator cores 20. This stress is caused by the difference in shrinkage between the two contacting members which results from temperature changes, and the stress increases in response to increases in the difference of the coefficient of linear expansion between the two contacting members.

In this invention, however, the coefficient of linear expansion $\alpha 1$ of the annular member 51 is greater than both the coefficient of linear expansion $\alpha 2$ of the magnetic steel plates and the coefficient of linear expansion $\alpha 3$ of the resin molded section 50. As a result, a compressive fixing force, which is applied from the outer periphery towards the radial direction of the annular member 51 by the annular member 51, is suitably applied to the stator cores 20 in response to lowering temperature. In this manner, the shearing stress between the resin molded section 50 and the stator cores 20 can be reduced because the stator cores 20 is shrunk by the compressive force. That is to say, the difference in shrinkage between the resin molded section 50 and the stator cores 20 at low temperatures is reduced by shrinking the stator core 20 with the annular member 51.

Thus it is possible to avoid leakage of cooling oil by mitigating the stress generated between the stator core 20 and the resin molded section 50.

The annular member 51 is formed separately (independently) to the case 1 housing the stator. Thus even when the stator is fitted to the case 1, it is possible to mitigate the stress between the stator cores 20 and the resin molded section 50. As a result, it is possible to remove restrictions on the method of assembling the stator 5 into the case 1.

Furthermore since the coefficient $\alpha 1$ of linear expansion of the annular member 51 is greater than coefficient $\alpha 3$ of linear expansion of the resin molded section 50, the relative displacement between the inner peripheral face of the annular member 51 and the outer peripheral face of the stator cores 20 resulting from cooling shrinkage is greater than the relative displacement between the outer peripheral face of the resin molded section and the inner peripheral face of the stator cores 20. The stresses acting between the resin molded section 50 and the stator cores 20 can be largely reduced by an appropriate adjustment of the thickness of the annular member 51.

Furthermore, the annular member 51 is preferably formed from a material comprising as large a Young's modulus as possible, in order to reduce the outer radius of the stator 5 by reducing the thickness of the annular member 51. This is due to the fact that the compressive force applied to the stator core 20 by the annular member 51 increases with increase in the Young's modulus of the annular member 51. Although the compressive force applied to the stator core 20 by the annular member 51 decreases as the thickness of the annular member 51 decreases, this decrease is compensated for by increasing the Young's modulus of the annular member 51. As a result, it is possible to reduce the thickness of the annular member 51.

Figure 3:
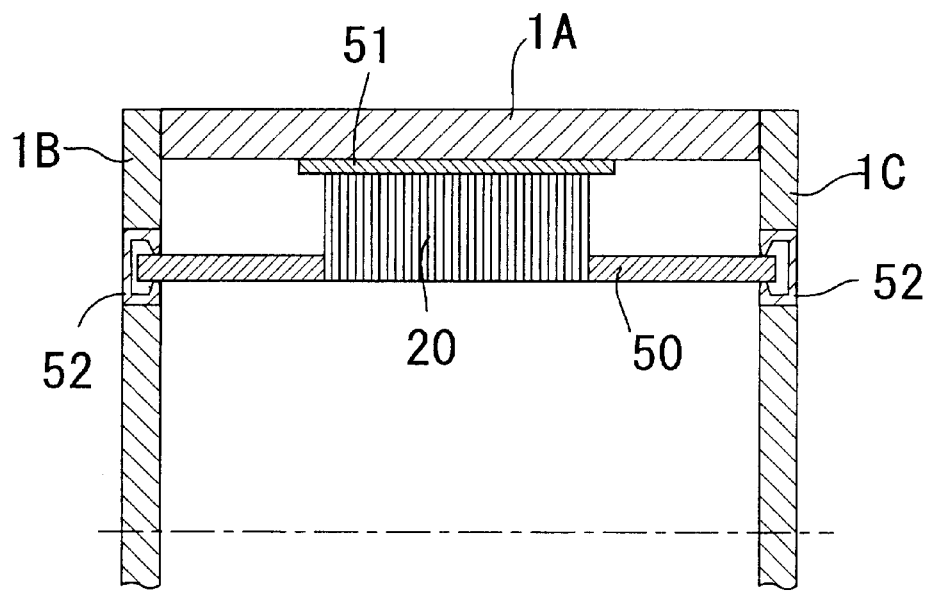
FIG. 3 is a sectional view along the axial direction schematically showing the main components of a rotating electric machine according to a second embodiment of this invention.

Referring to FIG. 3, the second embodiment of this invention will be described. FIG. 3 shows the principal components of a second embodiment of this invention. In the second embodiment, both ends of the resin molded section 50 are supported on cover plates 1B and 1C of the case 1 through an annular supporting member 52 formed from rubber. The supporting member 52 absorbs the difference in shrinkage between the resin molded section 50 and cover plates 1B, 1C which results from cooling. In other words, since the supporting member 52 displaces in response to cooling shrinkage of the resin molded section 50, the stress which would be expected from a hard support member not made of rubber is not produced by such a rubber supporting member. Thus it is possible to further reduce the stress produced between the stator core 20 and the resin molded section 50.

Figure 4:
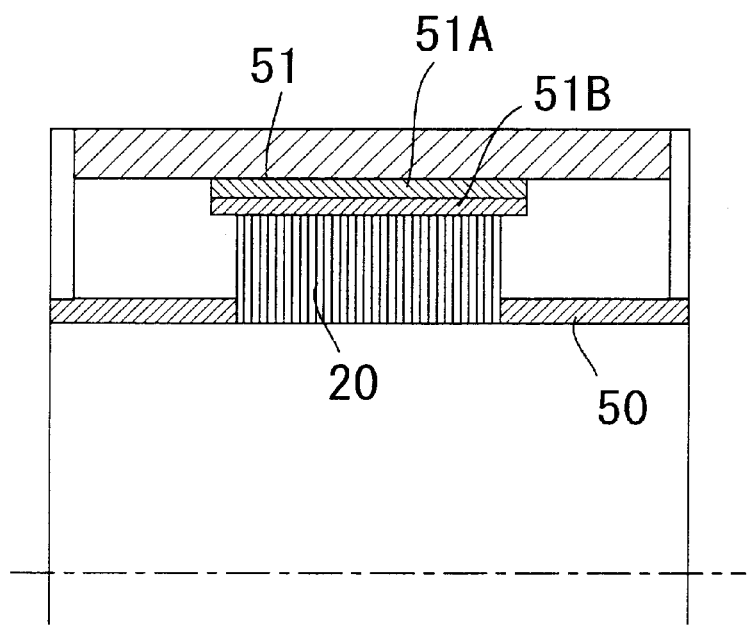
FIG. 4 is a sectional view along the axial direction schematically showing the main components of a rotating electric machine according to a third embodiment of this invention.

Referring to FIG. 4, the third embodiment of this invention will be described. FIG. 4 shows the principal components of a third embodiment of this invention. In this embodiment, the annular member 51 has a laminated structure comprising an outer layer 51A and an inner layer 51B which are formed from different materials. This embodiment allows the compressive force applied to the stator core 20 to be flexibly set depending on the materials used in the respective layers 51A, 51B. The outer layer 51A may be constituted of aluminum alloy and the inner layer 51B may be constituted of stainless steel. The aluminum alloy usually has a coefficient of linear expansion of $23\times 10^{-6}/°$ C. and the stainless steel usually has a coefficient of linear expansion of $17\sim 18\times 10^{-6}/°$ C. The use of aluminum alloy increases the compressive force generated by the annular member 51.

The entire contents of Japanese Patent Application P2001-186218 (filed Jun. 20, 2001) are incorporated herein by reference.

Although the invention has been described above by reference to certain embodiments of the invention, the invention is not limited to the embodiments described above.

Modifications and variations of the embodiments described above will occur to those skilled in the art, in light of the above teachings. The scope of the invention is defined with reference to the following claims.

What is claimed is:

1. A rotating electric machine, comprising:
   a rotor;
   a circular stator having a plurality of stator cores connected about an outer periphery of the rotor and an annular member disposed on an outer periphery of the plurality of stator cores each of the plurality of stator cores having a tooth with a tip directly facing the rotor;
   a case for housing the rotor and the stator;
   a resin molded section formed along an inner peripheral face of the stator and covering slot openings between stator cores, the resin molded section having a substantially cylindrical shape and being provided with a plurality of openings into which the tips of the teeth are inserted;

a cooling passage extending along an axial direction of the rotor and being defined by adjacent stator cores and the resin molded section; and wherein the annular member is formed from a material which has a larger coefficient of linear expansion than a magnetic material comprising the stator cores so as to reduce stresses acting between the resin molded section and the stator cores, the stresses being caused by the difference of the coefficient of linear expansion between the resin molded section and the stator cores.

2. The rotation electric machine as defined in claim 1, wherein the coefficient of linear expansion of the material comprising the annular member is greater than the coefficient of linear expansion of a material comprising the resin molded section.

3. The rotating electric machine as defined in claim 1, wherein the case comprises a rubber member which supports an end of the resin molded section.

4. The rotating electric machine as defined in claim 1, wherein the annular member comprises a plurality of radially-laminated annular layers, each annular layer formed from material different from material of the other annular layer.

5. The rotating electric machine as defined in claim 1, wherein the annular member is a member separate from the case.

6. The rotating electric machine as defined in claim 1, wherein the thickness of the annular member is selected as a function of the Young's modulus of the annular member.

7. The rotating electric machine as defined in claim 1, wherein the thickness of the annular member is selected such that the stresses acting between the resin molded section and the stator cores can be largely reduced.

8. The rotating electric machine as defined in claim 1, wherein the annular member comprises stainless steel.

9. The rotating electric machine as defined in claim 4, wherein the plurality of radially-laminated annular layers comprises a layer of aluminum alloy and a layer of stainless steel.

10. The rotating electric machine as defined in claim 1, wherein the coefficient of linear expansion of the resin molded section is greater than the coefficient of linear expansion of the stator cores.

11. The rotating electric machine as defined in claim 1, wherein the coefficient of linear expansion of the resin molded section and the coefficient of linear expansion of the stator cores are selected such that an amount of shrinkage of the stator cores approaches an amount of shrinkage of the resin molded section.

* * * * *